(12) United States Patent
Inoue et al.

(10) Patent No.: US 8,064,971 B2
(45) Date of Patent: Nov. 22, 2011

(54) MOBILE PHONE

(75) Inventors: Takahiro Inoue, Sapporo (JP); Shogo Ito, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 501 days.

(21) Appl. No.: 12/256,976

(22) Filed: Oct. 23, 2008

(65) Prior Publication Data

US 2009/0111540 A1 Apr. 30, 2009

(30) Foreign Application Priority Data

Oct. 26, 2007 (JP) ................................ P2007-279404

(51) Int. Cl.
*H04B 1/38* (2006.01)
(52) U.S. Cl. ............... 455/575.1; 455/575.3; 455/575.4; 455/575.8; 455/347
(58) Field of Classification Search ............... 455/575.1, 455/575.3, 575.4, 575.8, 347
See application file for complete search history.

(56) References Cited

U.S. PATENT DOCUMENTS

| | | | |
|---|---|---|---|
| 7,414,855 B1 * | 8/2008 | Arnold ........................... | 361/752 |
| 2002/0042252 A1 | 4/2002 | Toyoda et al. | |
| 2002/0042292 A1 * | 4/2002 | Hama ........................... | 455/572 |

FOREIGN PATENT DOCUMENTS

| | | |
|---|---|---|
| CN | 1337813 A | 2/2002 |
| EP | 1 301 011 A2 | 4/2003 |
| EP | 1 420 570 A1 | 5/2004 |
| EP | 1 830 541 A2 | 9/2007 |
| JP | 9-191338 | 7/1997 |
| JP | 2003-338857 | 11/2003 |
| JP | 2005-94533 | 4/2005 |
| JP | 2007-88735 | 4/2007 |

OTHER PUBLICATIONS

Chinese Office Action issued May 5, 2011, Chinese Patent Application No. 200810174943.0 with English translation.

* cited by examiner

*Primary Examiner* — Tuan Pham
(74) *Attorney, Agent, or Firm* — Oblon, Spivak, McClelland, Maier & Neustadt, L.L.P.

(57) ABSTRACT

The invention provides a mobile phone that effectively meets user needs to a high degree. A mobile phone in which a lower substrate on a operation panel side is foldably connected to a upper substrate on a liquid crystal display side, includes: a lower casing removably fitted to the lower substrate; a upper casing separated from the lower casing and removably fitted to the upper substrate; and a slip-off prevention section for fixing the lower casing to the lower substrate in such a manner that the lower casing is removable from the lower substrate, and for fixing the upper casing to the upper substrate in such a manner that the upper casing is removable from the upper substrate. The above constitution allows easily modifying the overall design of the mobile phone, thereby easily meeting the needs of the user to a high degree.

6 Claims, 19 Drawing Sheets

Fig.19
(a)
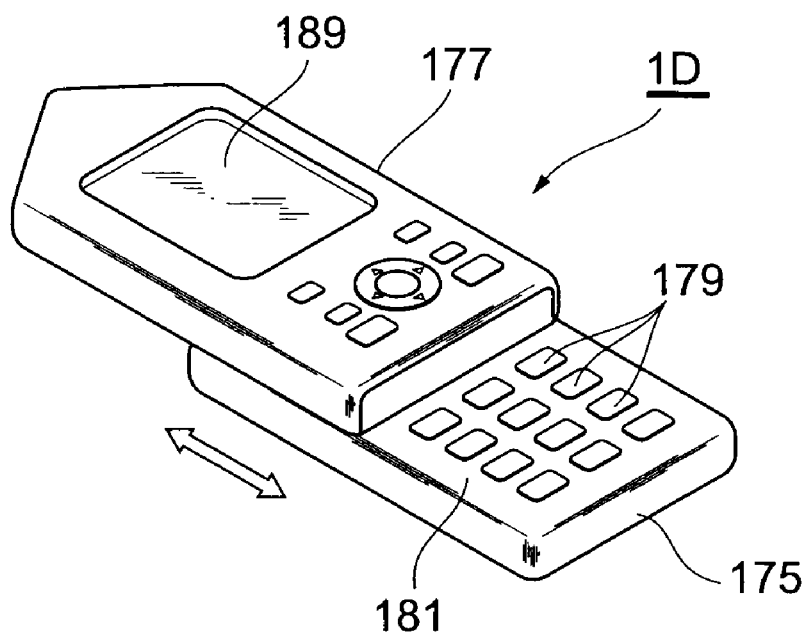
(b)
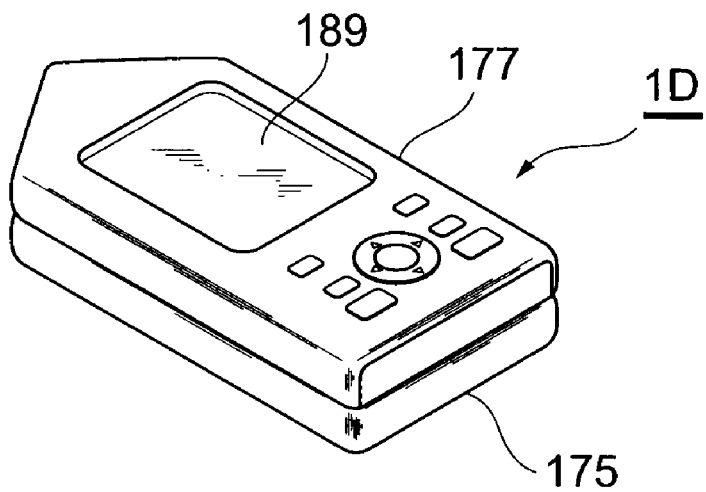

MOBILE PHONE

BACKGROUND OF THE INVENTION

1. Field of the Invention

The preset invention relates to a mobile phone, for instance a foldable, sliding or swivel mobile phone, in which a first substrate and a second substrate are connected relatively movably to each other.

2. Related Background Art

Mobile phones whose design can be chosen by the user are coming into market to meet the needs of users of increasingly diverse mobile phones. In such mobile phones, the needs of the user are met on the basis of a variety of, for instance, colors and patterns. Alternatively, the exterior of the mobile phone may feature a characteristic panel that is mounted on the mobile phone (see Japanese Patent Application Laid-open Nos. 2007-88735 and 2005-94533).

In conventional mobile phones, however, the above approaches involve merely modifying part of the outer shape of the phone, and fail thus to modify the entire appearance of the phone. In particular, it has been difficult hitherto to modify the entire outer shape of, for instance, foldable and slidable mobile phones. The needs of the user have thus been difficult to be widely met.

SUMMARY OF THE INVENTION

Therefore, it is an object of the present invention to provide a mobile phone that is effective in widely meeting user needs.

In order to solve the above problems, the present invention is a mobile phone in which a first substrate and a second substrate are connected relatively movably to each other, comprising: a first casing removably fitted to the first substrate; a second casing separated from the first casing and removably fitted to the second substrate; and a slip-off prevention section for fixing the first casing to the first substrate, and fixing the second casing to the second substrate.

In the mobile phone of the present invention, the first and second casings are removably fitted to the first substrate or the second substrate, and hence the overall design can be easily modified by replacing the first casing and the second casing by other casings. Also, the first casing and the second casing are separated, and hence the first casing and the second casing can be fitted independently to the first substrate or the second substrate, and can be easily replaced, even when the first substrate and the second substrate are connected relatively movably to each other. As a result, the needs of the user are easily met to a high degree.

Preferably, a connector section is provided in at least one of the first casing and the second casing, and an interface section, connected to the connector section, is provided in the first substrate or the second substrate. As a result, the connector section and the interface section are connected, becoming thereby usable for a specific function, by fitting the first casing or the second casing, on which the connector section is provided, to the first substrate or the second substrate.

Preferably, an operation panel, having operation buttons arranged thereon, is provided in at least one of the first casing and the second casing, and an input device for receiving inputs from a user pressing of the operation buttons, is provided in the first substrate or the second substrate. The pressing input of the operation buttons can be received by the input device by fitting the first casing or the second casing, on which the operation panel is provided, to the first substrate or the second substrate.

Preferably, a battery pack is provided in at least one of the first substrate and the second substrate, and the first casing or the second casing covers the battery pack, and serves as a lid thereof. The battery pack can be protected by fitting the first casing or the second casing to the first substrate or the second substrate.

Preferably, the slip-off prevention section comprises a first locking pawl provided retractably in the first substrate, a first spring section supporting the first locking pawl, a second locking pawl provided retractably in the second substrate, and a second spring section supporting the second locking pawl; a first locking hole, in which the first locking pawl engages, is formed in the first casing, and a second locking hole, in which the second locking pawl engages, is formed in the second casing, such that when compressed by the first casing, the first locking pawl retracts while elastically deforming the first spring section, the first casing being supported by the first locking pawl advancing into the first locking hole through decompression of the first spring section; and when compressed by the second casing, the second locking pawl retracts while elastically deforming the second spring section, the second casing being supported by the second locking pawl advancing into the second locking hole through decompression of the second spring section. In the above constitution, the first locking pawl gets into the first locking hole to support thereby the first casing, while the second locking pawl gets into the second locking hole to support thereby the second casing. Hence, the first casing and the second casing can be reliably and easily fixed to the first substrate or the second substrate.

Preferably, a first fitting opening for receiving the first substrate is formed at an end of the first casing, and a second fitting opening for receiving the second substrate is formed at an end of the second casing; the slip-off prevention section comprises: a first lid, provided at the end of the first casing, for opening the first fitting opening through elastic deformation upon being pressed by the first substrate when the first substrate passes by, and for closing the first fitting opening by being restored to its original state after the first substrate has passed by; and a second lid, provided at the end of the second casing, for opening the second fitting opening through elastic deformation upon being pressed by the second substrate when the second substrate passes by, and for closing the second fitting opening by being restored to the original state after the second substrate has passed by. The first fitting opening and the second fitting opening, which are opened through elastic deformation or the first lid and the second lid, are closed through restoration of the first lid or the second lid to its original state when the first substrate or the second substrate pass by the first lid or the second lid. As a result, the first casing and the second casing can be reliably and easily fixed to the first substrate or the second substrate.

Preferably, the first substrate and the second substrate are foldably connected via a hinge; a receiving opening for receiving the first substrate or the second substrate is formed at an end of the first casing and the second casing on a side adjacent to the hinge; a pair of protruding pieces, protruding so as to flank the hinge, are provided on at least one of the ends of the first casing and the second casing, with respective engaging holes being formed in the pair of protruding pieces; and wherein the slip-off prevention section has an engaging pawl section that is provided retractably in the hinge, and a spring section for supporting the engaging pawl section, such that the engaging pawl section retracts while elastically deforming the spring section upon being pressed by the protruding piece as the protruding piece passes by, and the spring section decompresses, while causing the slip-off prevention section to advance into the engaging hole, to support thereby the protruding piece. The first casing or the second casing can be reliably and easily fixed to the first substrate or the second substrate by causing the engaging pawl section to abut the protruding piece in the engaging hole.

The mobile phone of the present invention, thus, allows easily meeting user needs extensively.

BRIEF DESCRIPTION OF THE DRAWINGS

FIG. 19 is a diagram illustrating an open and closed state of the mobile phone according to the fourth embodiment, (a) being a perspective-view diagram illustrating a closed state and (b) being a diagram illustrating an open state.

DESCRIPTION OF THE PREFERRED EMBODIMENTS

Preferred embodiments of the transmission system according to the present invention are explained below with reference to accompanying drawings.

First Embodiment

Figure 1:
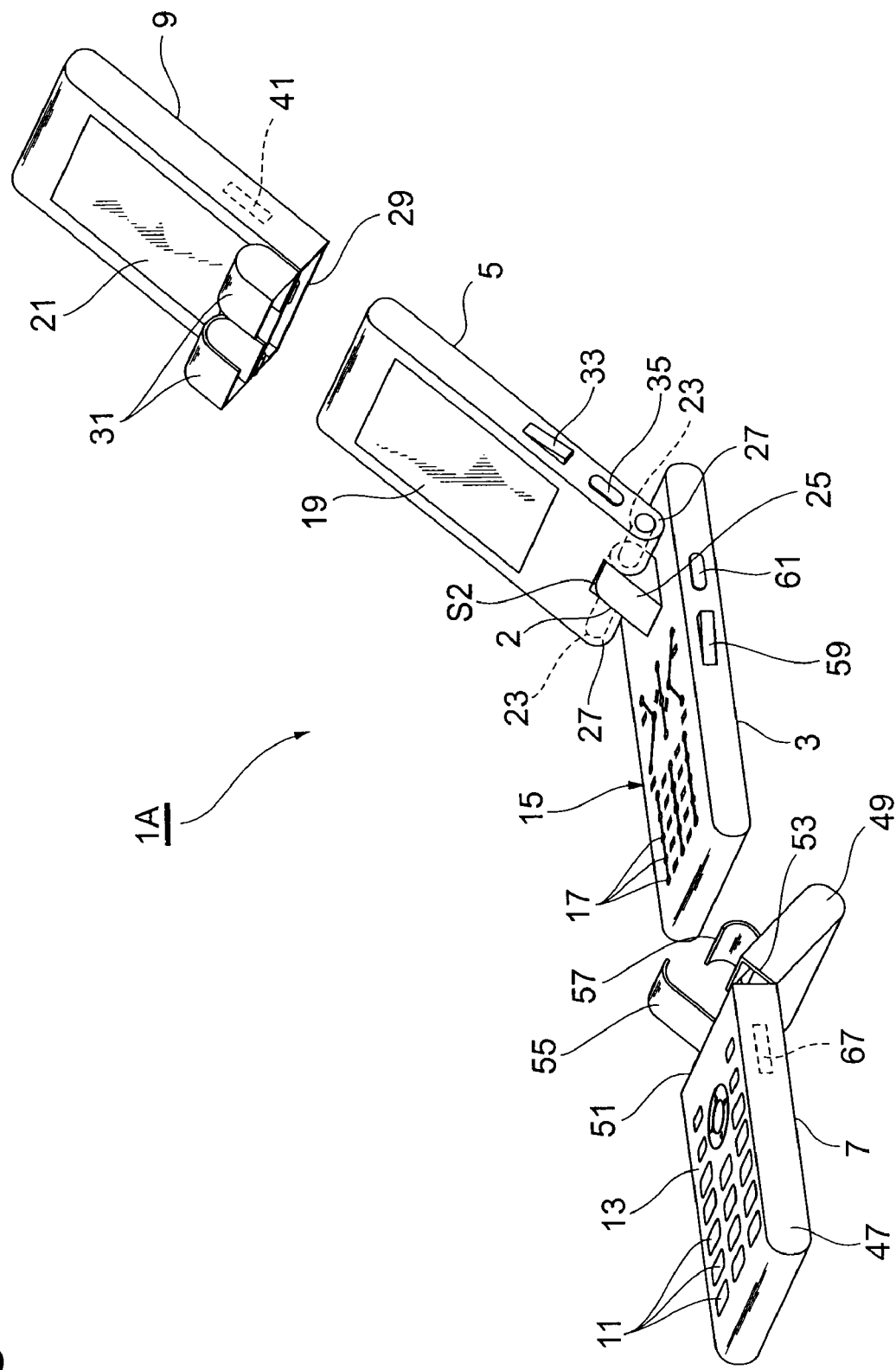
FIG. 1 is an exploded perspective-view diagram of a mobile phone according to a first embodiment.
Figure 2:
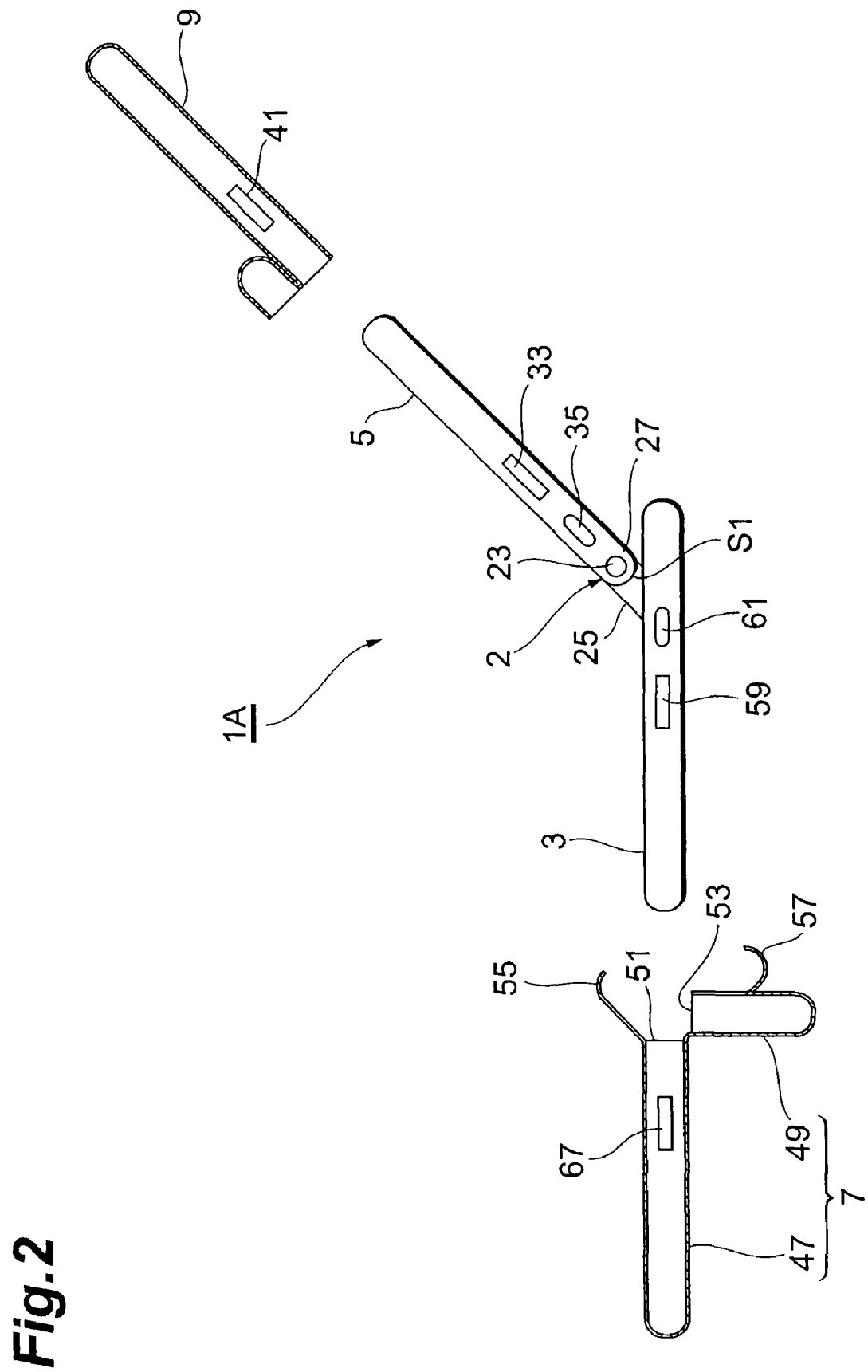
FIG. 2 is an exploded side-view cross-sectional diagram of the mobile phone according to the first embodiment.
Figure 3:
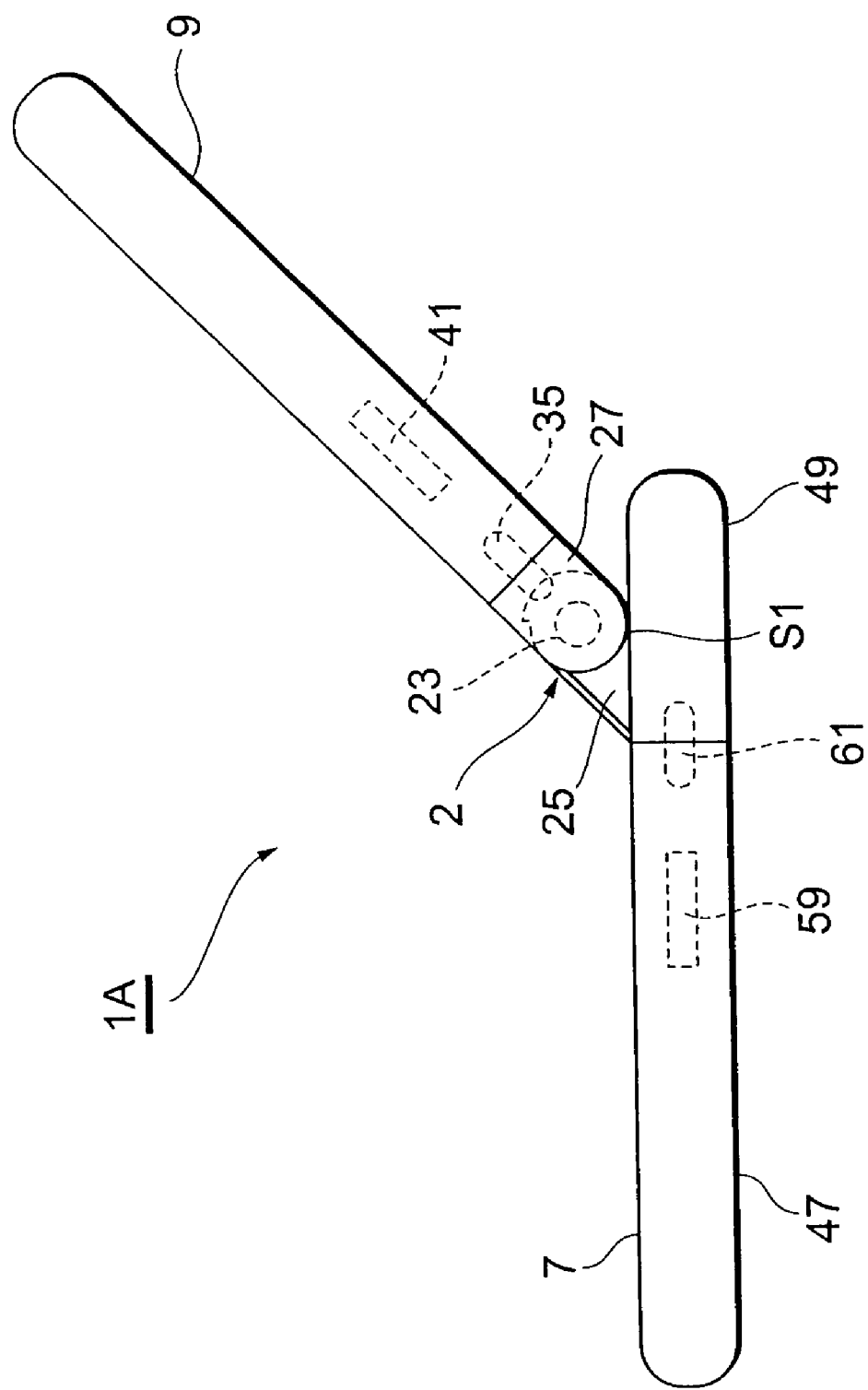
FIG. 3 is a side-view diagram of the mobile phone according to the first embodiment.
Figure 4:
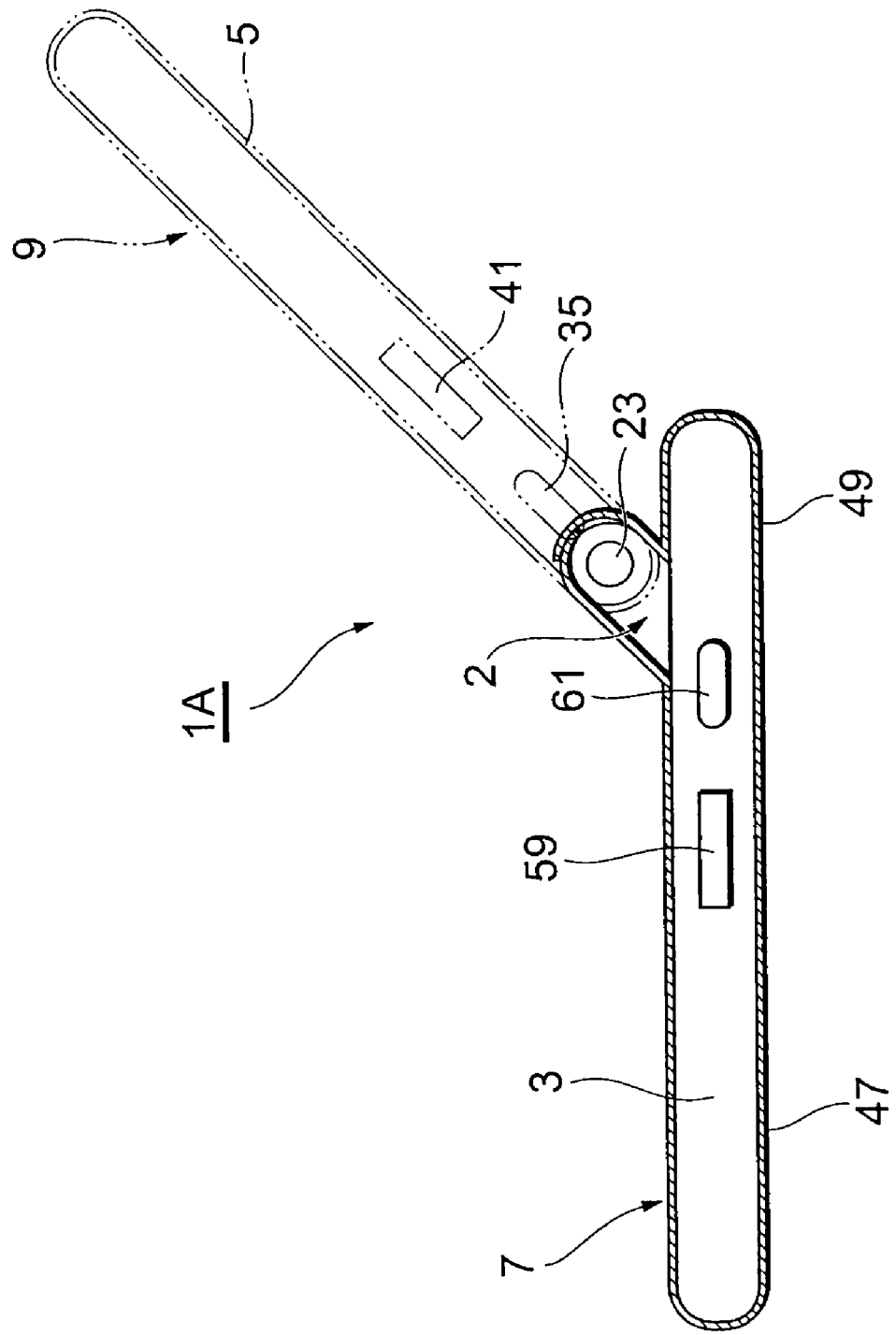
FIG. 4 is a side-view cross-sectional diagram of the mobile phone according to the first embodiment, focusing on a lower substrate and a lower casing.

FIG. 1 is an exploded perspective-view diagram of a mobile phone according to a first embodiment; FIG. 2 is side-view cross-sectional diagram of the mobile phone; FIG. 3 is a side-view diagram of the mobile phone; and FIG. 4 is a side-view diagram of the mobile phone focusing on a lower substrate and a lower casing.

A mobile phone 1A comprises a lower substrate (first substrate) 3 and an upper substrate (second substrate) 5 foldably connected with each other by way of a hinge 2. A lower casing (first casing) 7 is removably fitted to the lower substrate 3, and an upper casing (second casing) 9 is removably fitted to the upper substrate 5. The lower casing 7 and the upper casing 9 are separated and independent from each other prior to being fitted to the lower substrate 3 or the upper substrate 5. When the mobile phone 1A is in a folded, i.e. closed state, the upper casing 9 is superposed on the lower casing 7. In the explanation that follows, the faces of the lower casing 7 and the upper casing 9 that oppose when the mobile phone is closed are referred to as the inner faces of the lower casing 7 or of the upper casing 9, while the faces on the respective opposite sides are referred to as the outer faces. Similarly, the faces of the lower substrate 3 and the upper substrate 5 that oppose when the mobile phone is closed are referred to as the inner faces, while the faces on the respective opposite sides are referred to as the outer faces.

An operation panel 13, having disposed thereon a plurality of operation buttons 11, is provided on the inner face of the lower casing 7. An input device 15 for receiving inputs from the user through pressing of the operation buttons 11, is provided on the lower substrate 3. The input device 15 has a plurality of sensors 17 for detecting the pressure exerted by the user on the operations buttons 11, and a sensing circuit for receiving and optimizing the data detected by the sensors 17. A microphone and a wireless circuit (not shown) are fitted to the lower substrate 3.

On the upper substrate 5 there are fitted, for instance, a CPU for governing the driving control of the entire mobile phone 1A, a memory such as a RAM and/or ROM, a speaker and an antenna. A liquid crystal display (liquid crystal panel) 19 is further fitted to the inner face of the upper substrate 5. A transparent window 21, for allowing the liquid crystal display 19 to be seen, is provided on the inner face of the upper casing 9.

A mount 25, having formed therein a pair of pivots 23, is provided standing on the inner face of the lower substrate 3. The pair of pivots 23 is formed so as to protrude towards the left and right of the mount 25. Meanwhile, a pair of pivot bearings 27, for rotatably supporting the pivots 23, is provided at an end of the upper substrate 5. The pivot bearings 27 are disposed in such a way so as to flank the mount 25. The mount 25, the pair of pivots 23 and the pair of pivot bearings 27 make up the hinge 2. The lower substrate 3 and the upper substrate 5 can swing relative to each other by way of the hinge 2.

The upper casing 9, which is made of, for instance, a plastic resin, has formed therein a fitting opening 29 for receiving the upper substrate 5. Bag-like covers 31, into which the pivot bearings 27 of the upper substrate 5 are fitted, are provided at the end of the upper casing 9 that faces the fitting opening 29. A gap S1 (FIGS. 2 and 3) is formed between the pivot bearings 27 and the surface of the lower substrate 3. The covers 31 are fitted to the pivot bearings 27, moving in doing so into part of the gap S1. The covers 31 are connected to the upper casing 9 via connection pieces. The connection pieces, which comprise a highly-pliable and easily deformable resin member, are connected to the upper casing 9 in such a manner that they can be pulled out of the upper casing 9. The connection pieces are pulled out of the upper casing 9 when the covers 31 are pulled. When pushed into the upper casing 9, the connection pieces become housed in the upper casing 9. The covers 31 may also be swingably mounted on the upper casing 9 by way of hinges or the like.

Figure 5:
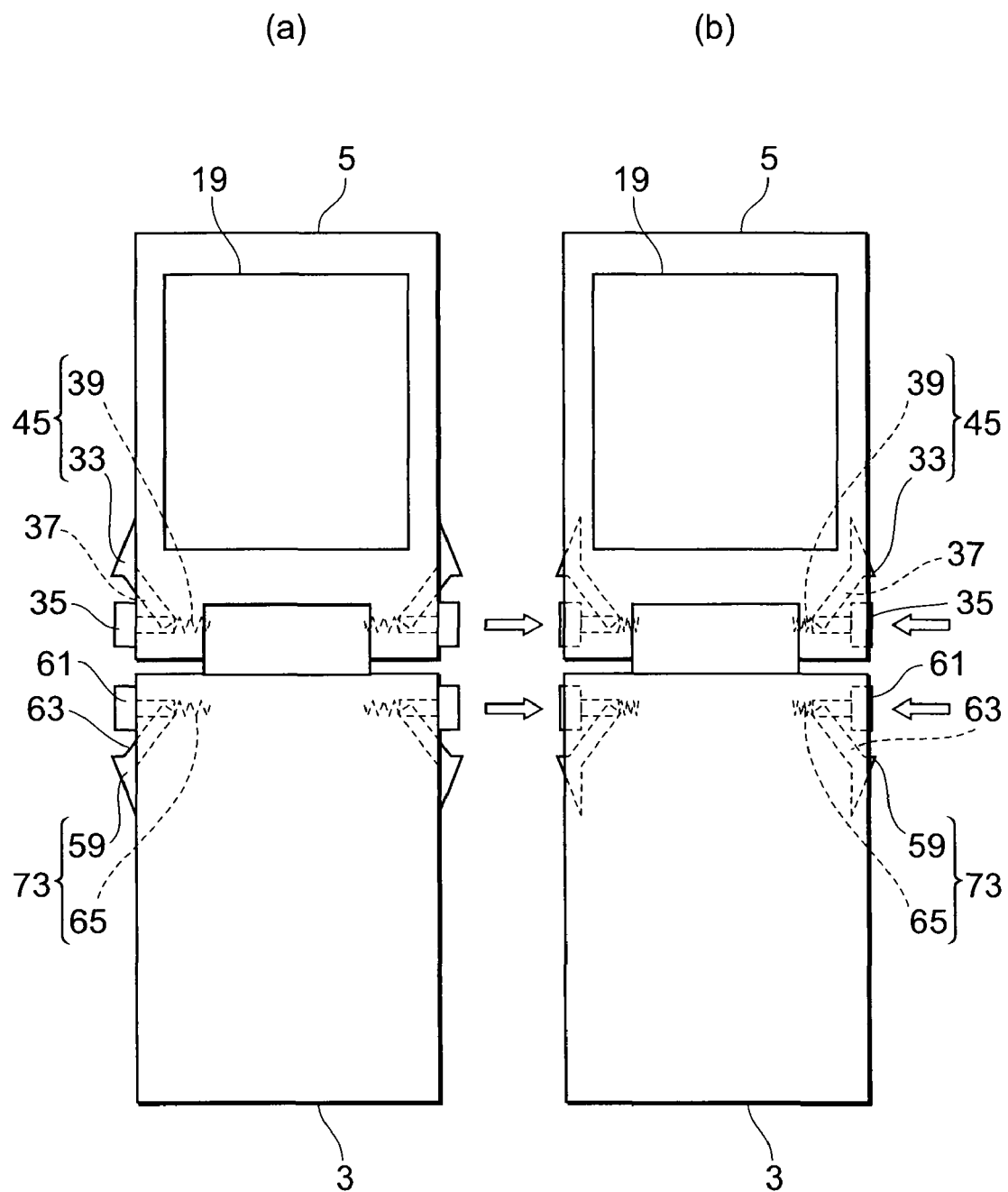
FIG. 5 is a plan-view diagram of the lower substrate and an upper substrate, (a) being a diagram illustrating a locked state and (b) being a diagram illustrating a lock-released state.
Figure 6:
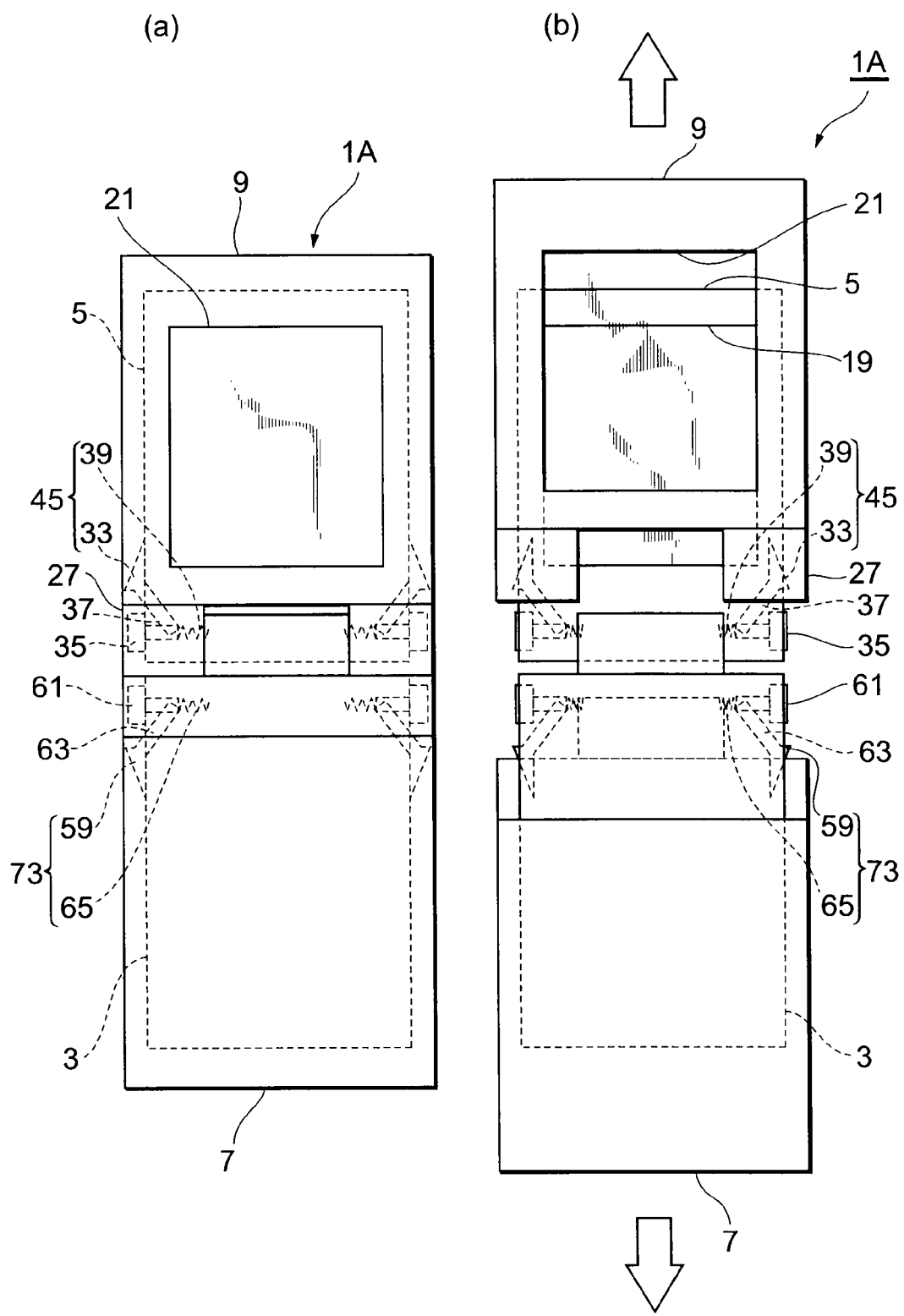
FIG. 6 is a diagram illustrating the lower casing and an upper casing in a fitted state, (a) being a plan-view diagram illustrating a state before lock release, and (b) being a plan-view diagram illustrating a state after lock release.

As illustrated in FIGS. 5 and 6, a locking pawl (second locking pawl) 33 and a lock release button 35 are provided each on the left and right of the upper substrate 5 in such a manner so as to be projectably retractable relative to the peripheral end face of the upper substrate 5. The lock release button 35 is disposed on the side of the base of the upper substrate 5 in the vicinity of the hinge 2. The locking pawl 33 is disposed further away from the hinge 2 than the lock release button 35, toward the leading end of the upper substrate 5. The locking pawl 33 and the lock release button 35 are fixed to an arm 37 that is disposed in the upper substrate 5. The arm 37 is forked, with one of the ends of the fork being fixed to the locking pawl 33 and the other end being fixed to the lock release button 35. The locking pawl 33 and the lock release button 35 are supported on a coil spring (second spring section) 39 via the arm 37.

A locking hole 41 (see FIG. 1 and FIG. 2) is formed inside the upper casing 9. The locking hole 41 is formed at a position facing the locking pawl 33 when the upper casing 9 is wholly fitted to the upper substrate 5. Part of the lock release button 35 remains exposed even when the upper casing 9 is wholly fitted to the upper substrate 5. That exposed part is covered up when the covers 31 are fitted to the pivot bearings 27.

The locking pawl 33 abuts the upper casing 9 when the upper substrate 5 is inserted into the upper casing 9. As insertion proceeds, the locking pawl 33 is pushed down by the upper casing 9 and retracts thereupon into the upper substrate 5, elastically deforming, in doing so, the coil spring 39, via the arm 37. When the upper substrate 5 is wholly inserted into the upper casing 9, the locking pawl 33 reaches the locking hole 41, whereupon the locking pawl 33, restored now to its original state, gets into the locking hole 41. As a result, the upper casing 9 hooks onto the pawl 33, becoming thereby supported on the upper substrate 5. The locking pawl 33 and the coil spring 39 make up a slip-off prevention section 45 of the upper substrate 5.

To release of the lock of the locking pawl 33 of the slip-off prevention section 45, the covers 31 are detached from the pivot bearings 27, whereupon part of the lock release button 35 becomes exposed. Pressing then part of the exposed lock release button 35 causes the locking pawl 33 to be also pushed into the upper substrate 5 together with the arm 37. In that state, the upper casing 9 can be removed from the upper substrate 5 by pulling the upper casing 9 out of the upper substrate 5. As described above, the slip-off prevention section 45 fixes the upper casing 9 to the upper substrate 5 in such a manner that the upper casing 9 is removable from the upper substrate 5.

As illustrated in FIG. 1, the lower casing 7, which is made of a plastic resin, comprises a main case 47 on which the operation panel 13 is assembled, and a cap 49. The main case 47 and the cap 49 are connected at the outer faces via connection pieces comprising a highly pliable material. The main case 47 and the cap 49 are fitted to the lower substrate 3 in such a manner so as to flank the mount 25 of the hinge 2. A fitting opening 51 for receiving the lower substrate 3 is formed in the main case 47. An insertion opening 53 for inserting part of the lower substrate 3 is formed in the cap 49. The main case 47 is fitted to the leading end of the lower substrate 3 where the plural sensors 17 and the like are mounted. The cap 49 is fitted in such a manner that so as to cover the remaining portion at the base of the lower substrate 3. The cap 49 may be swingably mounted on the main case 47 via a hinge or the like.

A band-like inner cover 55 is formed at the end of the main case 47 that faces the fitting opening 51, in such a manner that the cover 55 extends to be wrapped around the mount 25. A band-like outer cover 57 is formed at the end of the cap 49 that faces the insertion opening 53, in such a manner that the cover 57 extends to be wrapped around the mount 25. A gap S2 is formed between the mount 25 and the upper substrate 5. The inner cover 55 and the outer cover 57, which are connected to each other around the gap S2, cover the mount 25 by wrapping around the mount 25.

As illustrated in FIGS. 5 and 6, a locking pawl (first locking pawl) 59 and a lock release button 61 are provided each on the left and right of the lower substrate 3 in such a manner so as to be projectably retractable relative to the peripheral end face of the lower substrate 3. The locking pawl 59 is disposed further away from the mount 25 than the lock release button 61, toward the leading end of the lower substrate 3. The locking pawl 59 and the lock release button 61 are fixed to an arm 63 that is disposed in the lower substrate 3. The arm 63 is forked, with one of the ends of the fork being fixed to the locking pawl 59 and the other end being fixed to the lock release button 61. The locking pawl 59 and the lock release button 61 are supported on a coil spring (first spring section) 65 via the arm 63.

A locking hole 67 (see FIG. 1 and FIG. 2) is formed inside the main case 47 of the lower casing 7. The locking hole 67 is formed at a position facing the locking pawl 59 when the main case 47 is wholly fitted to the lower substrate 3. Part of the lock release button 61 remains exposed even when the main case 47 is wholly fitted to the lower substrate 3. That exposed part is covered up when the cap 49 is fitted to the lower substrate 3.

The locking pawl 59 abuts the lower casing 7 as the lower substrate 3 is inserted into the lower casing 7. As insertion proceeds, the locking pawl 59 is pushed down by the lower casing 7 and retracts thereupon into the lower substrate 3, elastically deforming, in doing so, the coil spring 65, via the arm 63. When the lower substrate 3 is wholly inserted into the lower casing 7, the locking pawl 59 reaches the locking hole 67, whereupon the locking pawl 59, restored now to its original state, gets into the locking hole 67. As a result, the lower casing 7 hooks onto the locking pawl 59, becoming thereby supported by the lower substrate 3. The locking pawl 59 and the coil spring 65 make up a slip-off prevention section 73 of the lower substrate 3.

To release of the lock of the locking pawl 59, the cap 49 is detached from the lower substrate 3, whereupon part of the lock release button 61 becomes exposed. Pressing then part of the exposed lock release button 61 causes the locking pawl 59 to be also pushed into the lower substrate 3 together with the arm 63. In that state, the lower casing 7 can be removed from the lower substrate 3 by pulling the lower casing 7 out of the lower substrate 3. As described above, the slip-off prevention section 73 fixes the lower casing 7 to the lower substrate 3 in such a manner that the lower casing 7 is removable from the lower substrate 3.

In the mobile phone 1A of the present embodiment, the lower casing 7 and the upper casing 9 are removably fitted to the lower substrate 3 of the upper substrate 5. Therefore, the overall design of the mobile phone 1A can be easily modified by replacing the lower casing 7 and the upper casing 9 by other casings. Moreover, the lower casing 7 and the upper casing 9 are separated from each other, and hence the lower casing 7 and the upper casing 9 can be fitted independently onto the lower substrate 3 or the upper substrate 5, even when the lower substrate 3 and the upper substrate 5 are connected so as to be swingable relative to each other. Both the lower casing 7 and the upper casing 9 can thus be easily replaced. The mobile phone 1A, therefore, extensively meets user needs easily.

Moreover, the lower casing 7 comprises the operation panel 13 where the operation buttons 11 are disposed, while the input device 15, for receiving inputs from the user through pressing of the operation buttons 11, is provided on the lower substrate 3. Moreover, the input device 15 may be configured so as to receive the pressing input of the operation buttons 11 wirelessly or the like, without the input device 15 being in contact with the operation buttons 11. The operation panel 13 is provided on the lower casing 7 and the input device 15 is provided on the lower substrate 3. Therefore, input by the user through pressing of the operation buttons 11 can be received by the input device 15 by fitting the lower casing 7 onto the lower substrate 3. The operation panel may also be provided on the upper casing 9 and the input device may also be provided on the upper substrate 5. In this case, the pressing input of operation buttons can be received by the input device by fitting the upper casing 9 onto the upper substrate 5.

In the present embodiment, the locking pawl 33 of the slip-off prevention section 45 gets into the locking hole 41, abutting the inner peripheral face that forms the locking hole 41 in such a manner that the locking pawl 33 hooks on the locking hole 41, thereby supporting the upper casing 9. Also, the locking pawl 59 of the slip-off prevention section 73 gets into the locking hole 67, abutting the inner peripheral face that forms the locking hole 67 in such a manner that the locking pawl 59 hooks on the locking hole 67, thereby supporting the lower casing 7. As a result, the upper casing 9 and the lower casing 7 can be reliably and easily fixed to the upper substrate 5 of the lower substrate 3.

In the present embodiment, the input device 15, a microphone and/or a wireless circuit (not shown) are mounted on the lower substrate 3, while a main CPU, a memory such as a RAM and/or a ROM, a speaker, an antenna and a liquid crystal display 19 are mounted on the upper substrate 5. However, the above arrangement may also be reversed so that the liquid crystal display 19 is mounted on the lower substrate 3 and the input device 15 is mounted on the upper substrate 5. In that case, a transparent window for allowing the liquid crystal display 19 to be seen, may be provided on the lower casing 7, while an operation panel having an operation buttons disposed thereon may be provided on the upper casing 9. Furthermore, for example, by using an all-in-one casing on which a display is mounted, the all-in-one casing may be connected via an interface with a substrate on which a display is not mounted.

Second Embodiment

Figure 7:
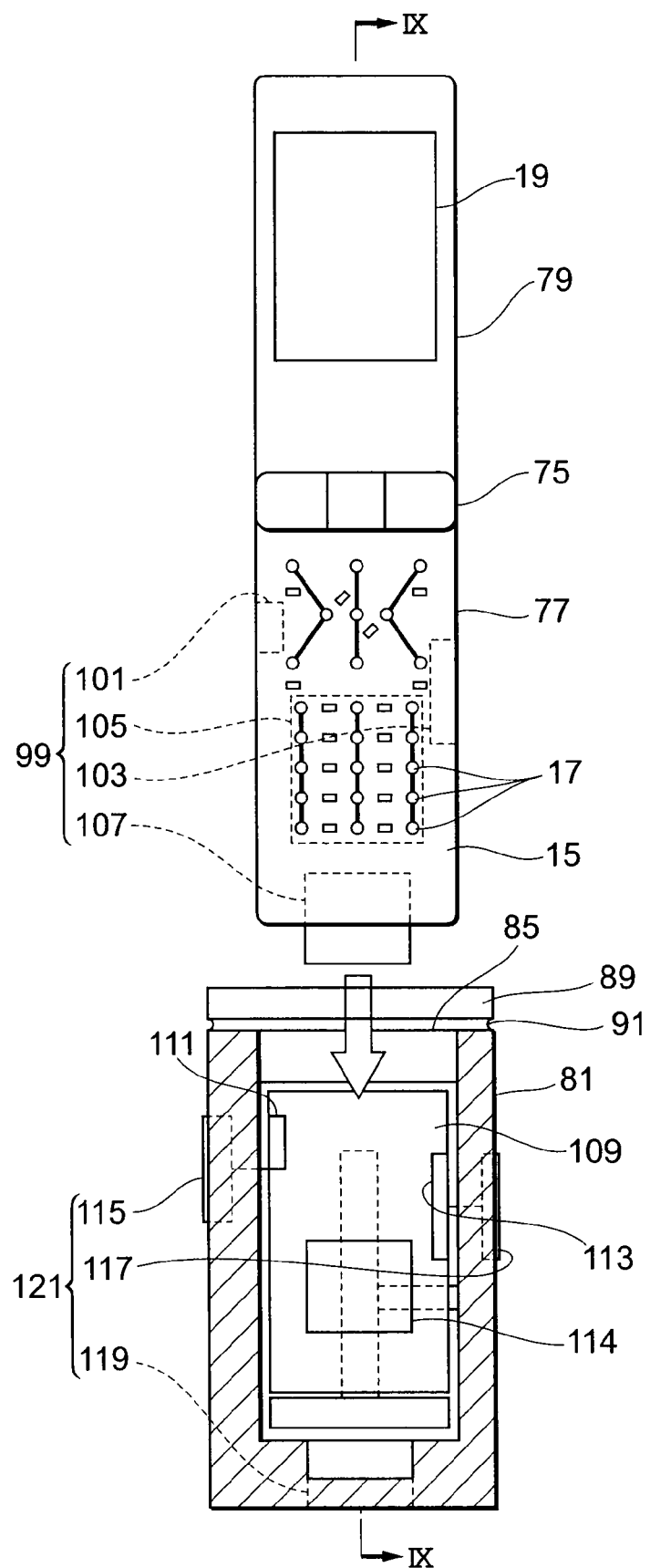
FIG. 7 is a plan-view diagram illustrating a lower substrate before insertion in a lower casing, according to a second embodiment.
Figure 8:
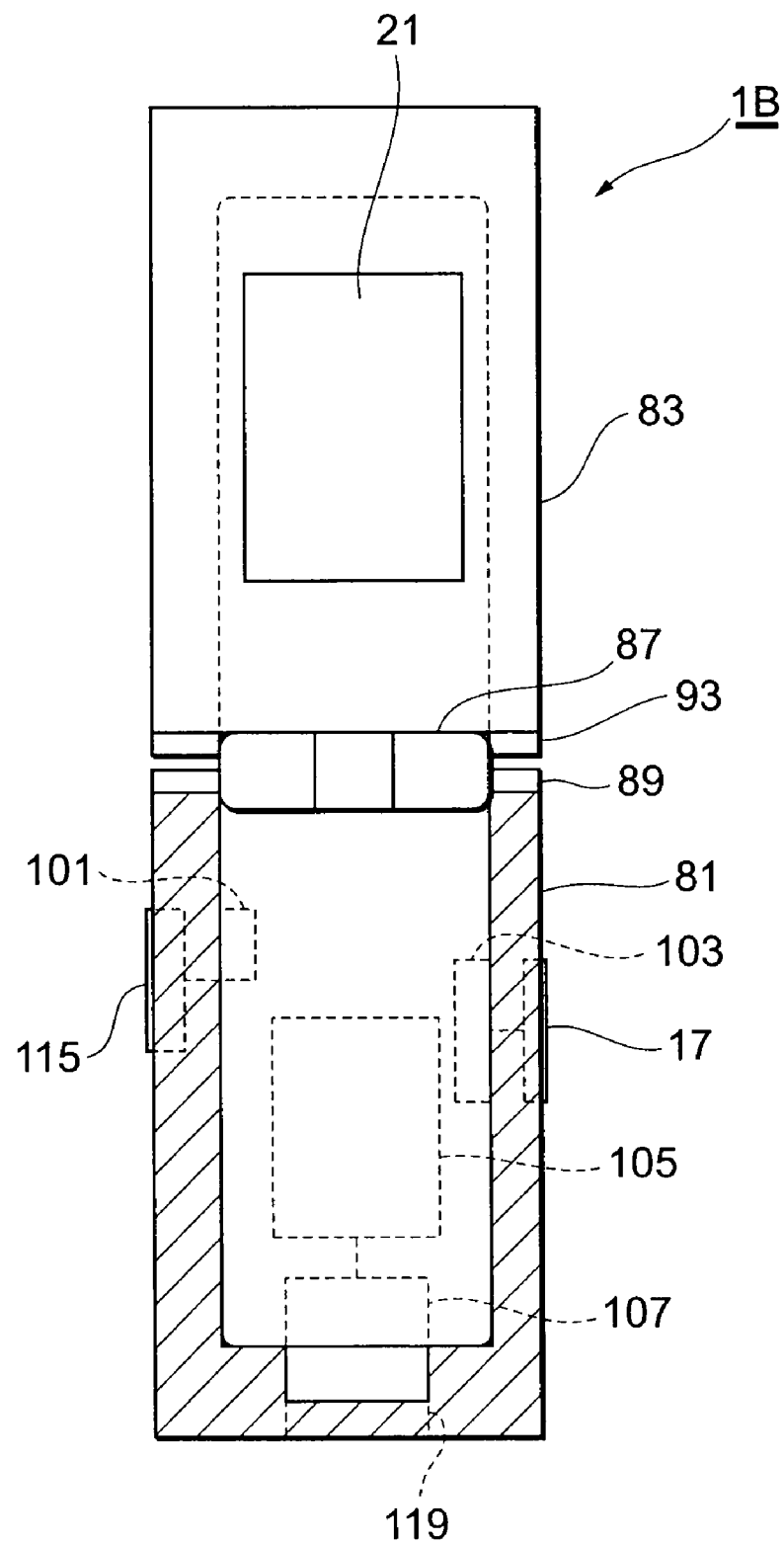
FIG. 8 is a plan-view diagram illustrating a cross section of the lower casing in a mobile phone according to the second embodiment.
Figure 9:
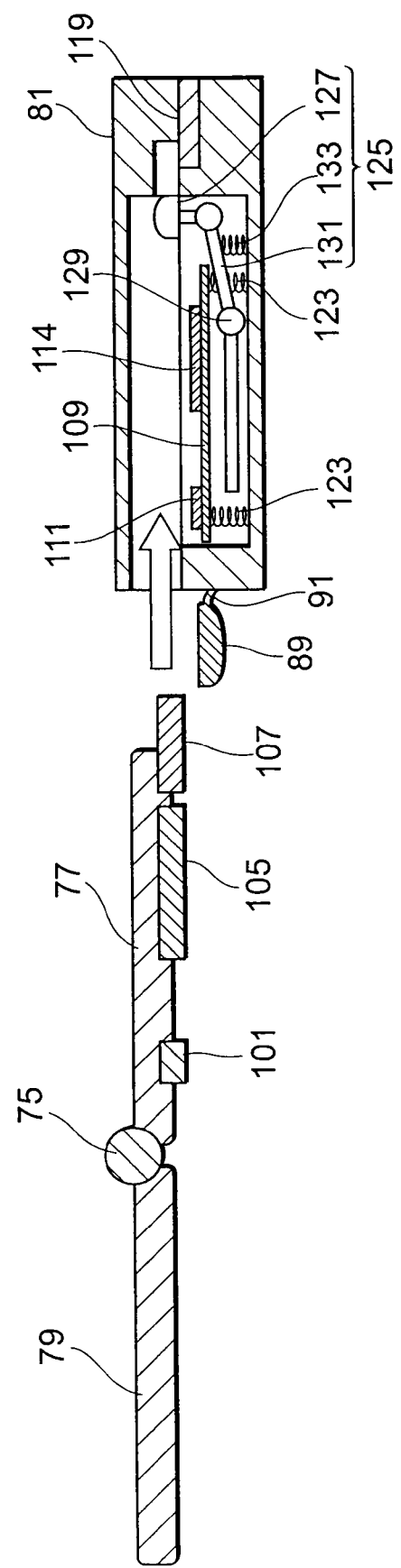
FIG. 9 is a cross-sectional diagram of FIG. 7 along line IX-IX.
Figure 10:
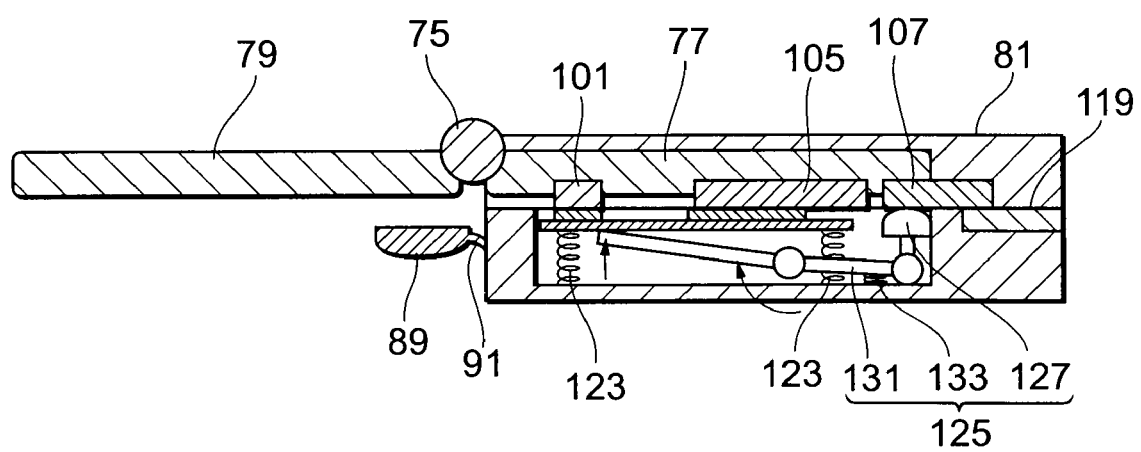
FIG. 10 is a side-view cross-sectional diagram illustrating the lower casing inserted in the lower substrate in the second embodiment.
Figure 11:
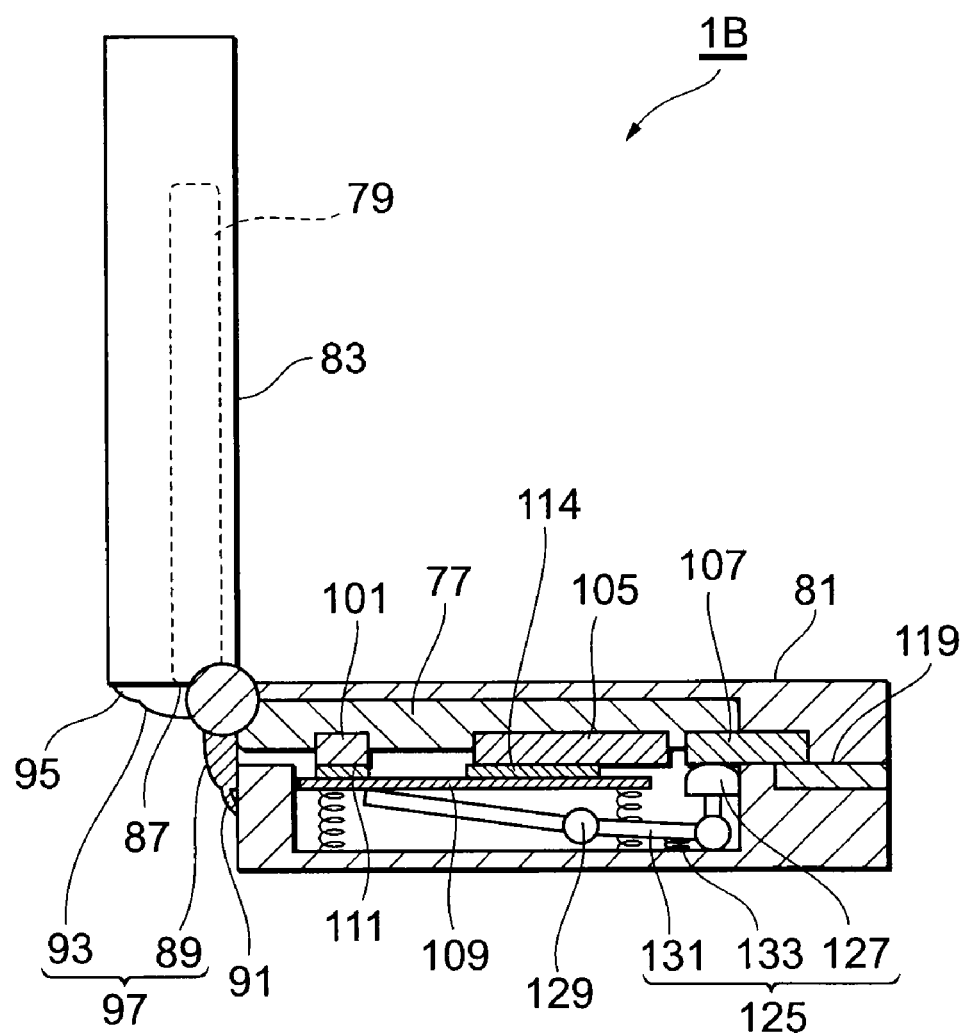
FIG. 11 is a side-view cross-sectional diagram of the mobile phone according to the second embodiment.

A mobile phone 1B according to a second embodiment of the present invention is explained next with reference to FIG. 7 to FIG. 11. FIG. 7 is a plan-view diagram illustrating a lower casing shown in a cross section before fitting onto a lower substrate, and illustrating a cross section of the lower casing; FIG. 8 is a plan-view diagram of the mobile phone, the lower casing being shown in a cross section; FIG. 9 is a cross-sectional diagram of FIG. 7 along the line IX-IX; FIG. 10 is a side cross-sectional diagram illustrating the lower casing fitted to the lower substrate; and FIG. 11 is a side-view diagram of the mobile phone in which the lower substrate and the lower casing are shown in cross section. Elements and structures of the mobile phone 1B that are identical to those of the mobile phone 1A of the first embodiment are denoted with identical reference numerals, and the explanation thereof is omitted.

As illustrated in FIGS. 7 and 8, the mobile phone 1B comprises a lower substrate (first substrate) 77 and an upper substrate (second substrate) 79 foldably connected with each other by way of a hinge 75. A lower casing (first casing) 81 is removably fitted to the lower substrate 77, and an upper casing (second casing) 83 is removably fitted to the upper substrate 79. The lower casing 81 and the upper casing 83 are separated and independent from each other prior to being fitted to the lower substrate 77 or the upper substrate 79. A fitting opening 85 for receiving the lower substrate 77 is formed in the lower casing 81. A fitting opening 87 for receiving the upper substrate 79 is formed in the upper casing 83.

A lower lid (first lid) 89 is provided on the end of the lower casing 81 facing the fitting opening 85. The lower lid 89 has provided thereon a band-like elastic connection piece 91 that is fixed to the end of the lower casing 81. When the lower lid 89 is picked and pulled, the elastic connection piece 91 deforms elastically and bends to open the fitting opening 85. When the hand lets go of the lower lid 89, the elastic connection piece 91 is restored to its original state and the lower lid 89 is displaced so as to close off the fitting opening 85. When the lower substrate 77 is inserted into the fitting opening 87, the elastic connection piece deforms elastically under the pressure of the lower substrate 77 as the latter passes through the fitting opening 85, so that the fitting opening 85 is kept open. Once the lower substrate 77 has passed by, however, the elastic connection piece is restored to its original state, whereupon the lower lid 89 closes off the fitting opening 85.

Similarly, an upper lid (second lid) 93 is provided on the end of the upper casing 83 facing the fitting opening 87. The upper lid 93 has provided thereon a band-like elastic connection piece 95 (see FIG. 11) that is fixed to the end of the upper casing 83. When the upper substrate 79 is inserted into the open fitting opening 87, the elastic connection piece 95 deforms elastically and bends when pushed by the upper substrate 79 as the latter passes through the fitting opening 87, as a result of which the fitting opening 85 is kept open. Once the upper substrate 79 has passed by, however, the elastic connection piece 95 is restored to its original state, whereupon the upper lid 93 closes off the fitting opening 87. The lower lid 89 and the upper lid 93 make up a slip-off prevention section 97.

In addition to the input device 15, the lower substrate 77 has mounted thereon, for instance, an earphone connector terminal 101, a horizontal button terminal 103, a battery pack 105 and a charger 107, all of which make up an interface section 99. A circuit board 109 is built into the lower casing 81. On the circuit board 109 there are mounted, for instance, an earphone connector connection terminal 111 connected to the earphone connector terminal 101, a horizontal button connection terminal 113 connected to the horizontal button terminal 103, and a conduction terminal 114 connected to the battery pack 105. On the lower casing 81 there are also provided an earphone connector 115 electrically connected to the earphone connector connection terminal 111 of the circuit board 109, a horizontal button 117 electrically connected to the horizontal button connection terminal 113, and an adapter 119 physically and electrically connected to the charger 107. In the present embodiment, the earphone connector 115, the horizontal button 117 and the adapter 119 make up a connector section 121, although the connector section 121 is not limited to the foregoing elements.

As illustrated in FIGS. 9 to 10, the circuit board 109 is supported by springs 123. On the rear face of the circuit board 109 there is provided a link mechanism 125 that raises the circuit board 109 towards the lower substrate 77 in response to the insertion of the latter. The link mechanism 125 comprises a pad 127 abutting the charger 107 that is provided at the leading end portion of the lower substrate 77; a lever 131 extending in two directions with a pivot 129 as a fulcrum, one end of the lever 131 being connected to the pad 127, the other end abutting the rear face of the circuit board 109; and a spring section 133 for urging and supporting the pad 127.

When fitting the lower casing 81 to the lower substrate 77, the lower lid 89 is opened to open thereby the fitting opening 85, as illustrated in FIGS. 7 and 9. The lower substrate 77 is inserted then into the fitting opening 85. When the lower substrate 77 is completely inserted into the lower casing 81, as illustrated in FIG. 10, the charger 107 becomes connected to the adapter 119. The charger 107 pushes the pad 127 down, whereby the circuit board 109 is raised via the link mechanism 125. Thereupon, the earphone connector connection terminal 111 of the circuit board 109 becomes connected to the earphone connector terminal 101, the horizontal button connection terminal 113 becomes connected to the horizontal button terminal 103, and the conduction terminal 114 becomes electrically connected to the battery pack 105. Fitting the lower casing 81 onto the lower substrate 77 causes the battery pack 105 to be covered up by the lower casing 81, which functions thus as a lid of the battery pack 105. Instead of the earphone connector connection terminal 111 there may be provided an electrical connection terminal, such that the circuit board 109 and the battery pack 105 are conductively connected via the electric connection terminal when the lower substrate 77 is inserted. When the battery pack is provided in the upper substrate 79, the upper casing 83 can function as a lid of the battery pack.

As is the case in the mobile phone 1A according to the first embodiment, the overall design of the mobile phone in the present embodiment can also be easily modified, and thus user needs are met easily to a high degree.

As the lower substrate 77 or the upper substrate 79 is being inserted into the fitting opening 85 or the fitting opening 87, the lower lid 89 or the upper lid 93 according to the present embodiment remains in an elastically deformed state, whereby the fitting opening 85 and the fitting opening 87 are kept open. Once the lower substrate 77 or the upper substrate 79 has passed through the fitting opening 85 or the fitting opening 87, the lower lid 89 or the upper lid 93 is restored to its original state, closing thereby the fitting opening 85 or the fitting opening 87. As a result, the lower casing 81 and the upper casing 83 can be reliably and easily fixed to the lower substrate 77 or the upper substrate 79.

In the present embodiment, moreover, the connector section 121 is provided for instance in the lower casing 81, and the lower substrate 77 comprises the interface section 99 that is connected to the connector section 121 when the lower casing 81 is fitted to the lower substrate 77. As a result, the connector section 121 and the interface section 99 are connected, becoming thereby usable for a specific function, by fitting the lower casing 81 to the lower substrate 77. When the connector section 121 is provided in the upper casing 83 and the interface section 99 is provided in the upper substrate 79, the connector section 121 and the interface section 99 are connected, becoming thereby usable for a specific function, by fitting the upper casing 83 to the upper substrate 79.

Third Embodiment

Figure 12:
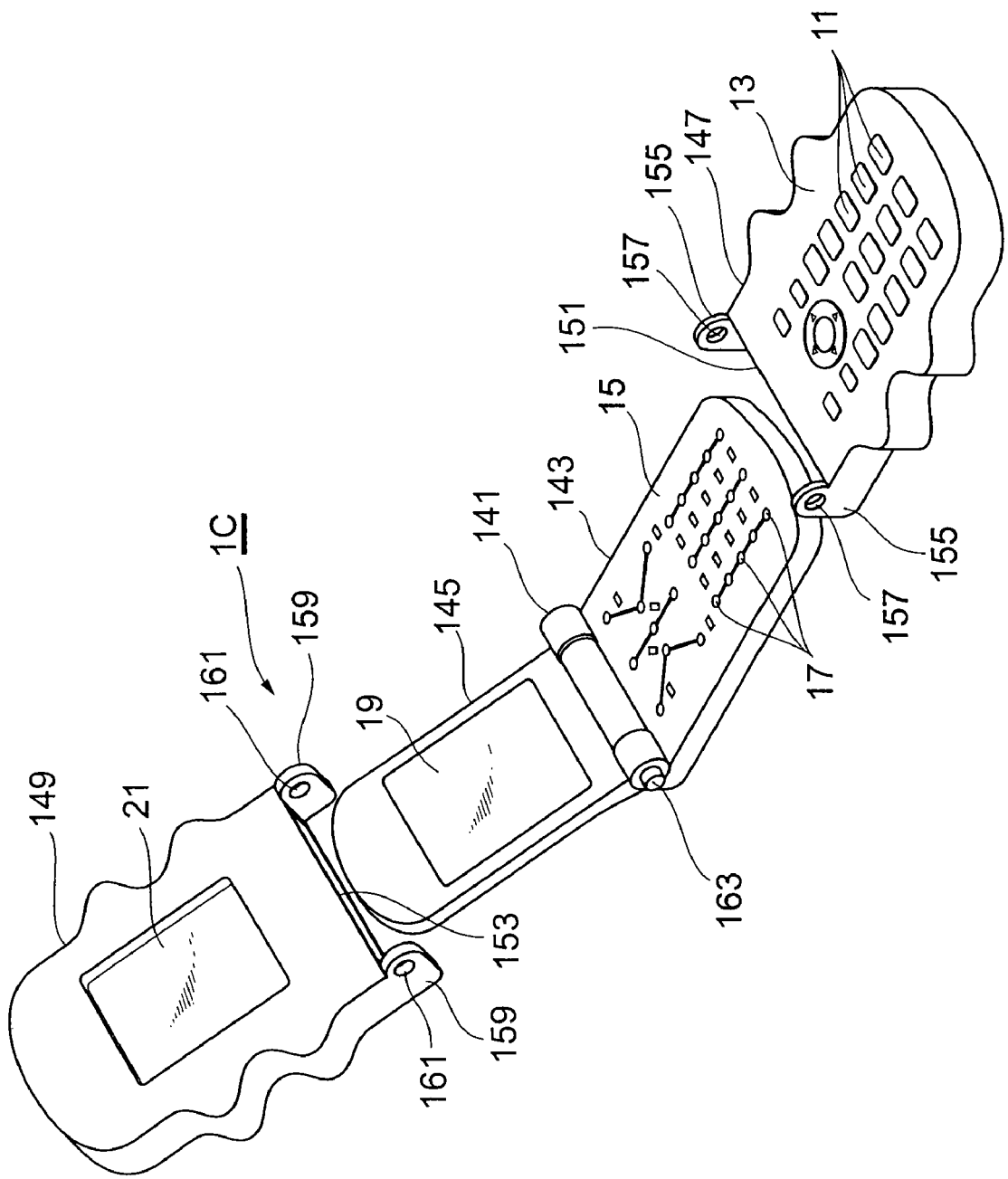
FIG. 12 is an exploded perspective-view diagram of the mobile phone according to a third embodiment.
Figure 13:
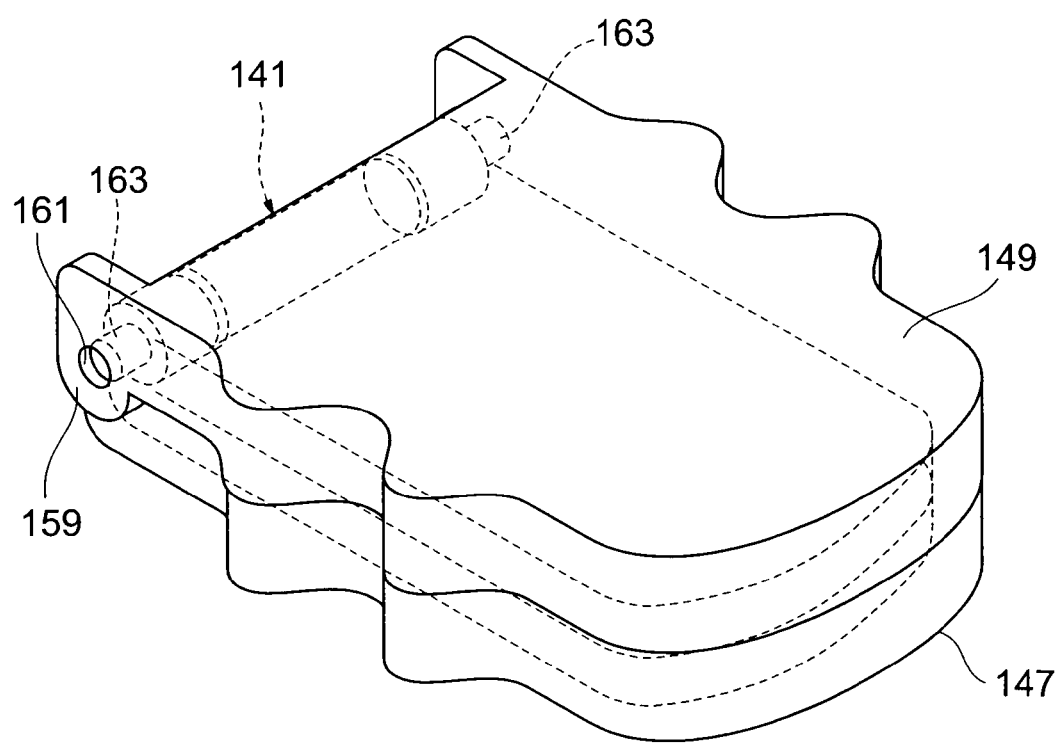
FIG. 13 is a perspective-view diagram of the mobile phone according to the third embodiment in a folded state.
Figure 14:
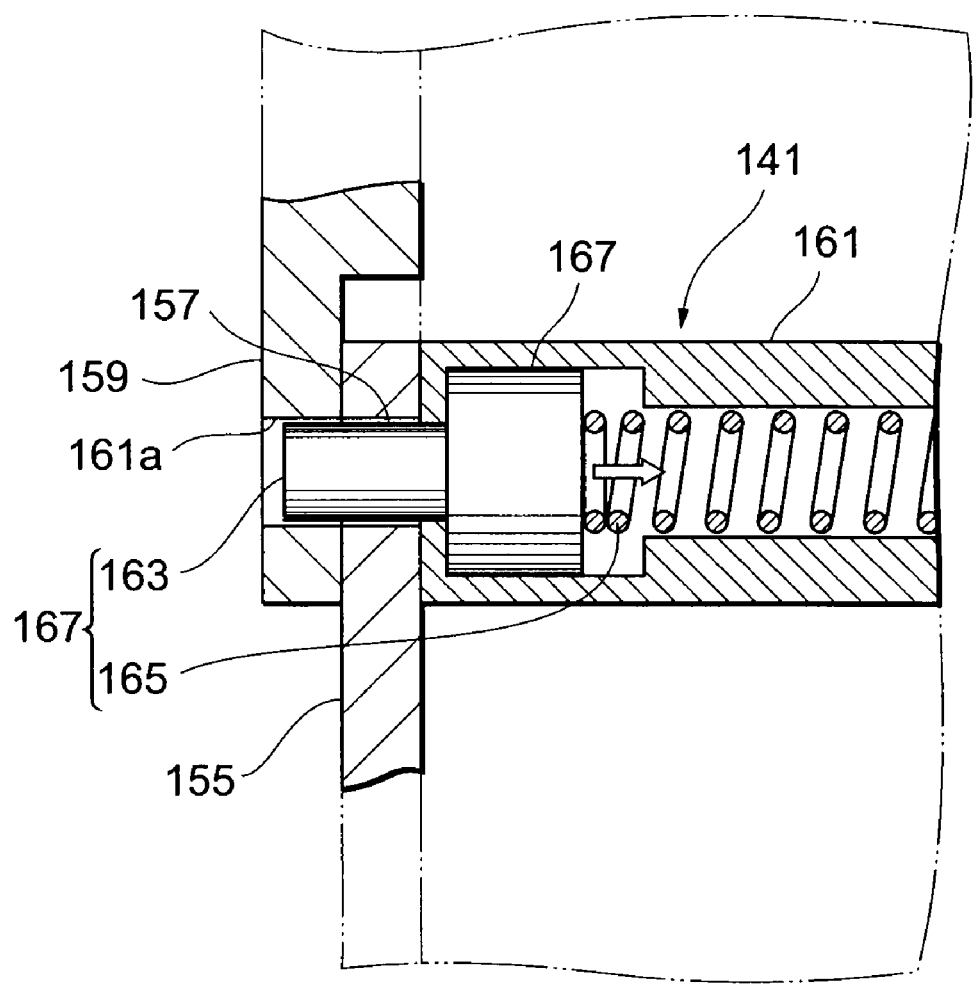
FIG. 14 is an enlarged cross-sectional diagram focusing on an engaging pawl and an engaging hole.
Figure 15:
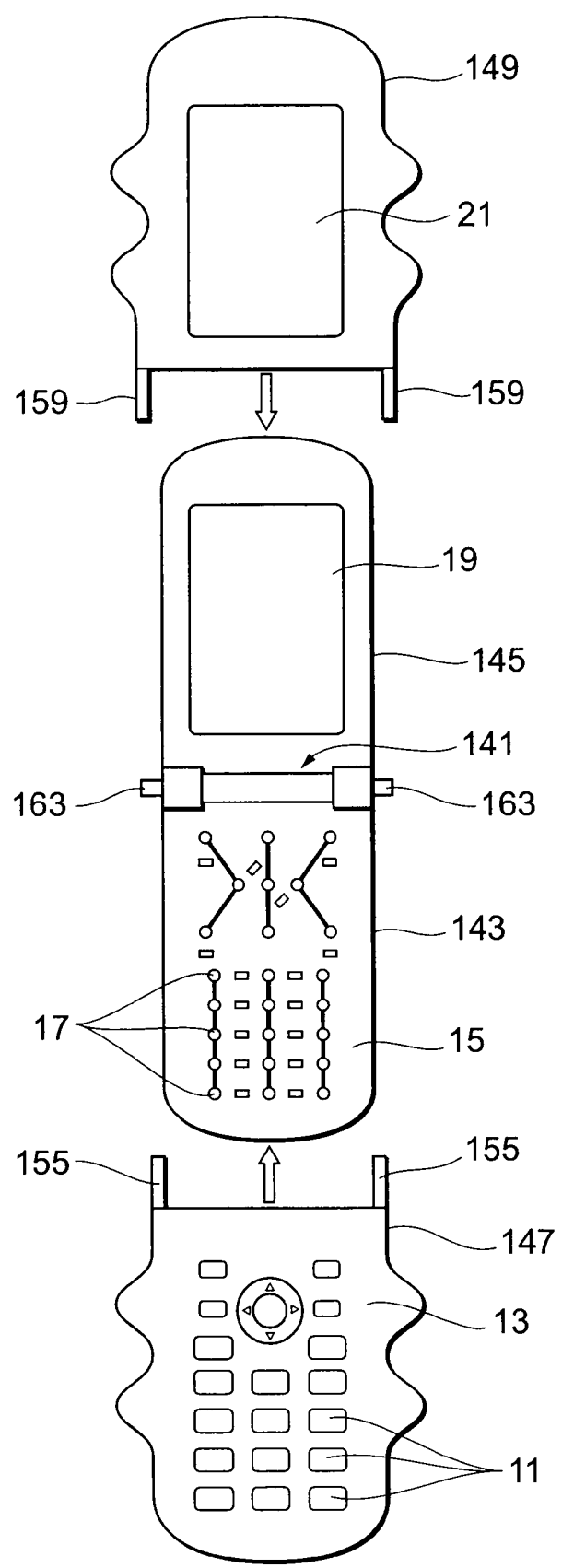
FIG. 15 is an exploded plan-view diagram of the mobile phone according to the third embodiment.
Figure 16:
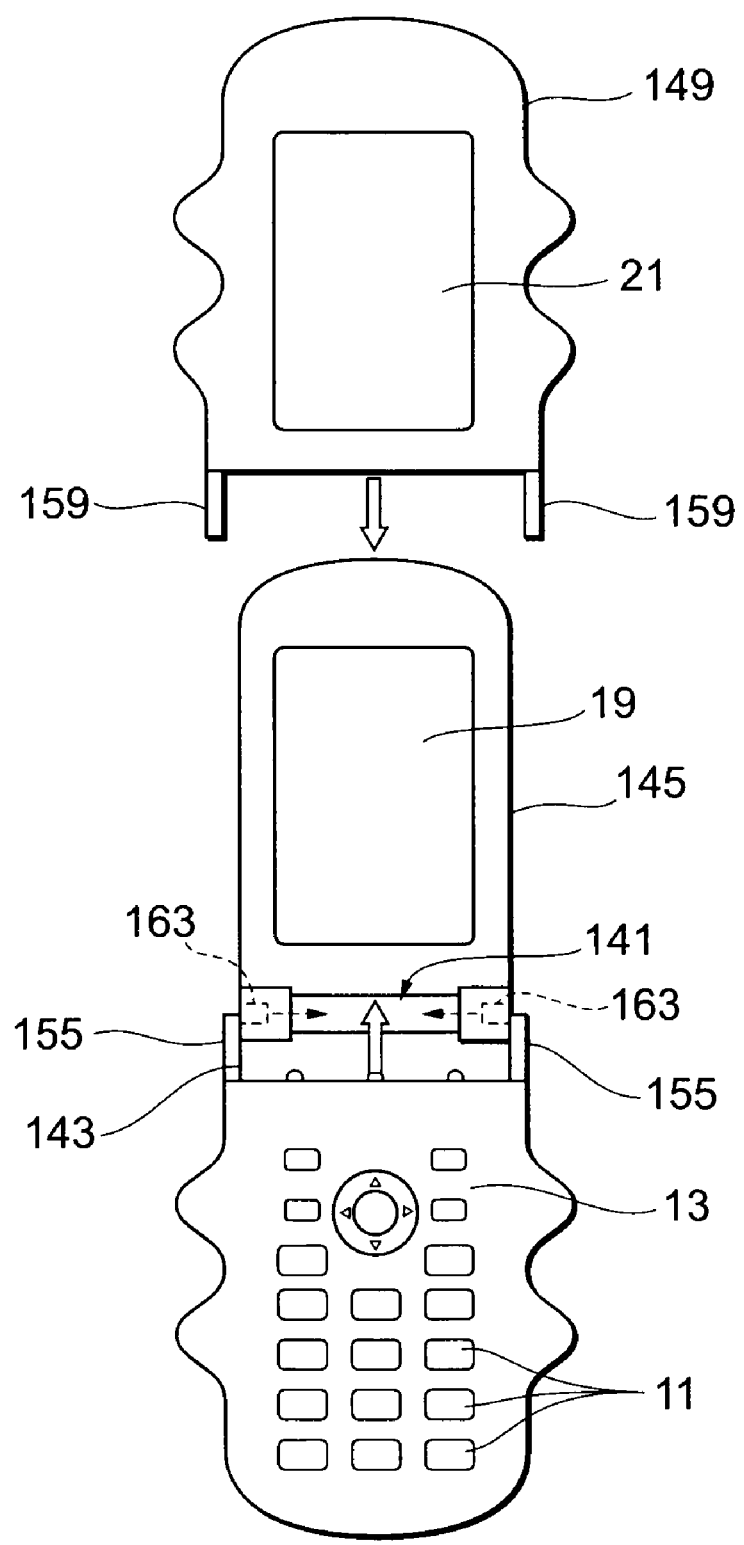
FIG. 16 is a plan-view diagram illustrating the mobile phone of the third embodiment while being assembled.
Figure 17:
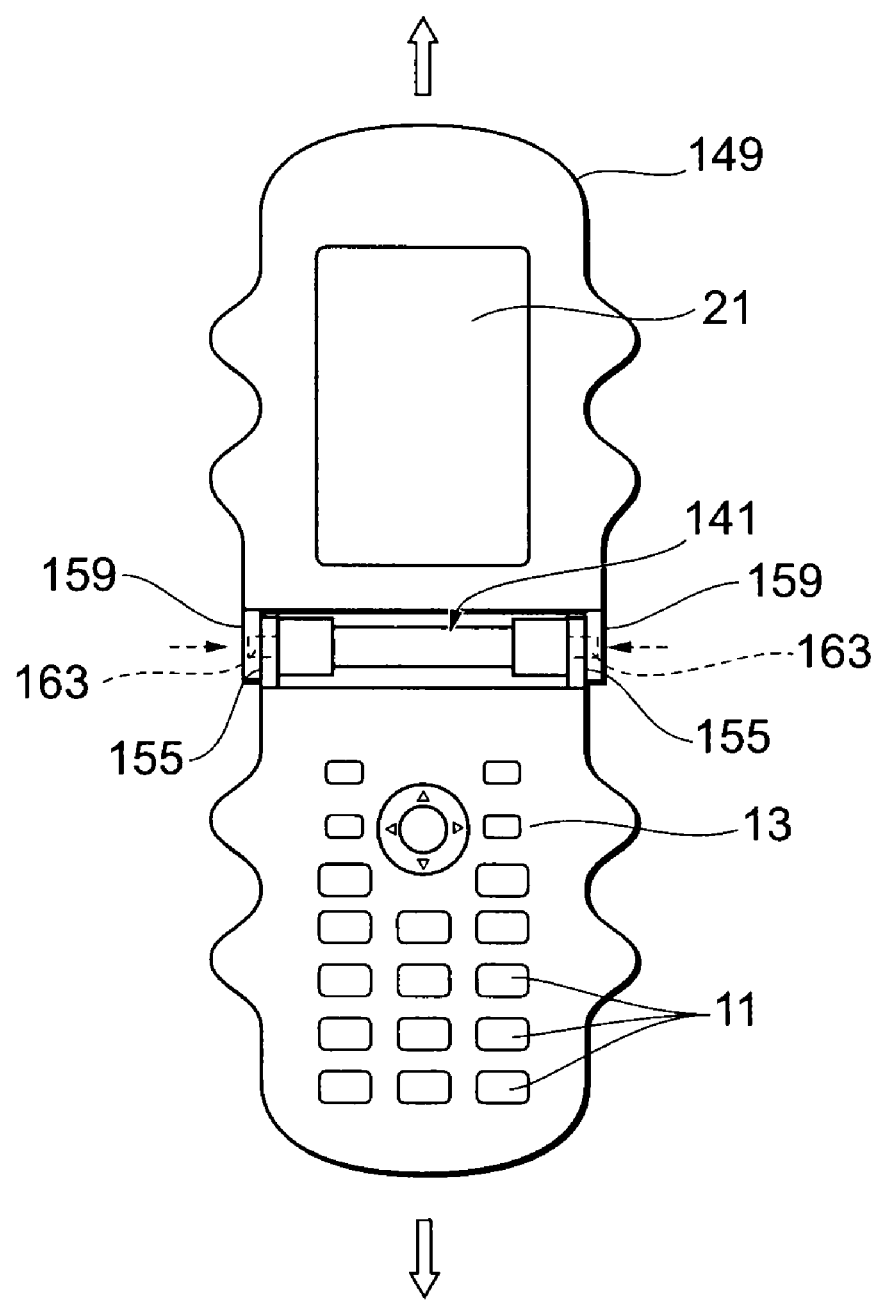
FIG. 17 is a plan-view diagram illustrating the mobile phone of the third embodiment prior to being disassembled.

A mobile phone 1C according to a third embodiment of the present invention is explained next with reference to FIGS. 12 to 17. FIG. 12 is a perspective-view diagram of a mobile phone 1C according to the present embodiment; FIG. 13 is a perspective-view diagram of the mobile phone in a folded state; FIG. 14 is an enlarged cross-sectional diagram focusing on an engaging pawl and an engaging hole; FIG. 15 is an exploded plan-view diagram of a mobile phone; FIG. 16 is a plan-view diagram illustrating the mobile phone while being assembled; and FIG. 17 is a plan-view diagram illustrating the mobile phone prior to being disassembled. Elements and structures of the mobile phone 1C that are identical to those of the mobile phone 1A of the first embodiment are denoted with identical reference numerals, and the explanation thereof is omitted.

The mobile phone 1C comprises a lower substrate (first substrate) 143 and an upper substrate (second substrate) 145 foldably connected with each other by way of a hinge 141. A lower casing (first casing) 147 is removably fitted to the lower substrate 143, and an upper casing (second casing) 149 is removably fitted to the upper substrate 145. The lower casing 147 and the upper casing 149 are separated and independent from each other prior to being fitted to the lower substrate 143 or the upper substrate 145. A fitting opening (receiving opening) 151 for receiving the lower substrate 143 is formed on the end of the lower casing 147, on the side adjacent to the hinge 141. A fitting opening (receiving opening) 153 for receiving the upper substrate 145 is formed on the end of the upper casing 149, on the side adjacent to the hinge 141.

A pair of protruding pieces 155 is provided at the end of the lower casing 147 that faces the fitting opening 151, in such a manner that the protruding pieces 155 flank the hinge 141. A circular engaging hole 157 is formed at each protruding piece 155. A pair of protruding pieces 159 is provided at the end of the upper casing 149 that faces the fitting opening 153, in such a manner that the protruding pieces 159 flank the hinge 141. A circular engaging hole 161 is formed at each protruding piece 159. The protruding pieces 155 of the lower casing 147 overlap with the protruding pieces 159, on the inner side of the protruding pieces 159 of the upper casing 149, i.e. on the side closer to the hinge 141. The engaging holes 157 and the engaging holes 161 are disposed so as to be concentric with the axis of the hinge 141. The inward-outward arrangement of the protruding pieces 155 and the protruding pieces 159 may be reversed. The protruding pieces 155 and the protruding pieces 159 are formed of a highly pliable resin, for instance rubber or the like, that deforms readily when compressed.

An engaging pawl section 163 is provided at each of the two ends of the pivot 161 of the hinge 141, so as to be projectably retractable relative to the pivot 161 along the axial direction thereof. The engaging pawl section 163 is shaped as a solid cylinder. Inside the pivot 161 there is provided a circular seat 167 on which a coil spring 165 is set. The engaging pawl sections 163, which are urged and supported by the coil spring 165, get into the engaging holes 157 of the inner-side protruding pieces 155 and the engaging holes 161 of the outer-side protruding pieces 159, to abut the lower casing 147 and the upper casing 149 and support thereby the lower casing 147 and the upper casing 149. The engaging pawl section 163 and the coil spring (spring section) 165 make up a slip-off prevention section 167.

As illustrated in FIGS. 15 and 16, when the lower substrate 143 is inserted into the lower casing 147, the protruding pieces 155 of the lower casing 147 abut the engaging pawl sections 163. In passing over the engaging pawl sections 163, the protruding pieces 155 compress the coil spring 165 via the engaging pawl sections 163. The coil spring 165 is elastically deformed by being compressed by the protruding pieces 155, whereupon the engaging pawl sections 163 retract into the pivot 161. When the engaging holes 157 of the protruding pieces 155 reach the engaging pawl sections 163, the coil spring 165 recovers its original state, and the engaging pawl sections 163 get into the engaging holes 157. As a result, the engaging pawl sections 163 abut the faces of the engaging holes 157 formed in the protruding pieces 155, to support thereby the lower casing 147. The engaging pawl sections 163 protrude then out of the engaging holes 157.

When the upper substrate 145 is inserted next into the upper casing 149, the protruding pieces 159 of the upper casing 149 abut the engaging pawl sections 163. In passing over the engaging pawl sections 163, the protruding pieces 159 compress the coil spring 165 via the engaging pawl sections 163. The coil spring 165 is elastically deformed by being compressed by the protruding pieces 159, whereupon the engaging pawl sections 163 retract into the engaging holes 157. When the engaging holes 161 of the protruding pieces 159 reach the engaging pawl sections 163, the coil spring 165 recovers its original state, whereby the engaging pawl sections 163 get into the engaging holes 161. As a result, the engaging pawl sections 163 abut the faces of the engaging holes 161 formed in the protruding pieces 159, to support thereby the upper casing 149 (see FIG. 14).

To release the locking state, the upper casing 149 is pulled while pressing and clamping the protruding pieces 159 on the left and right, as illustrated in FIG. 17. Thereupon, the engaging pawl sections 163 come off the engaging holes 161 of the protruding pieces 159, whereby the upper casing 149 can be removed from the upper substrate 145.

Next, the lower casing 147 is pulled while pressing and clamping together protruding pieces 155 and the engaging pawl sections 163 on the left and right. Thereupon, the engaging pawl sections 163 come off the engaging holes 157 of the protruding pieces 155, whereby the lower casing 147 can be removed from the lower substrate 143. As described above, the slip-off prevention section 167 fixes the lower casing 147 to the lower substrate 143 in such a manner that the lower casing 147 is removable from the lower substrate 143, and fixes the upper casing 149 to the upper substrate 145 in such a manner that the upper casing 149 is removable from the upper substrate 145.

As is the case in the mobile phone 1A according to the first embodiment, the overall design of the mobile phone in the present embodiment can also be easily modified, and thus user needs are met easily to a high degree.

In the present embodiment, moreover, the lower casing 147 can be mounted easily and reliably on the lower substrate 143 by having the engaging pawl sections 163 abut the protruding pieces 155 in the engaging holes 157. Likewise, the upper casing 149 can be mounted easily and reliably on the upper substrate 145 by having the engaging pawl sections 163 abut the protruding pieces 159 in the engaging holes 161.

Fourth Embodiment

Figure 18:
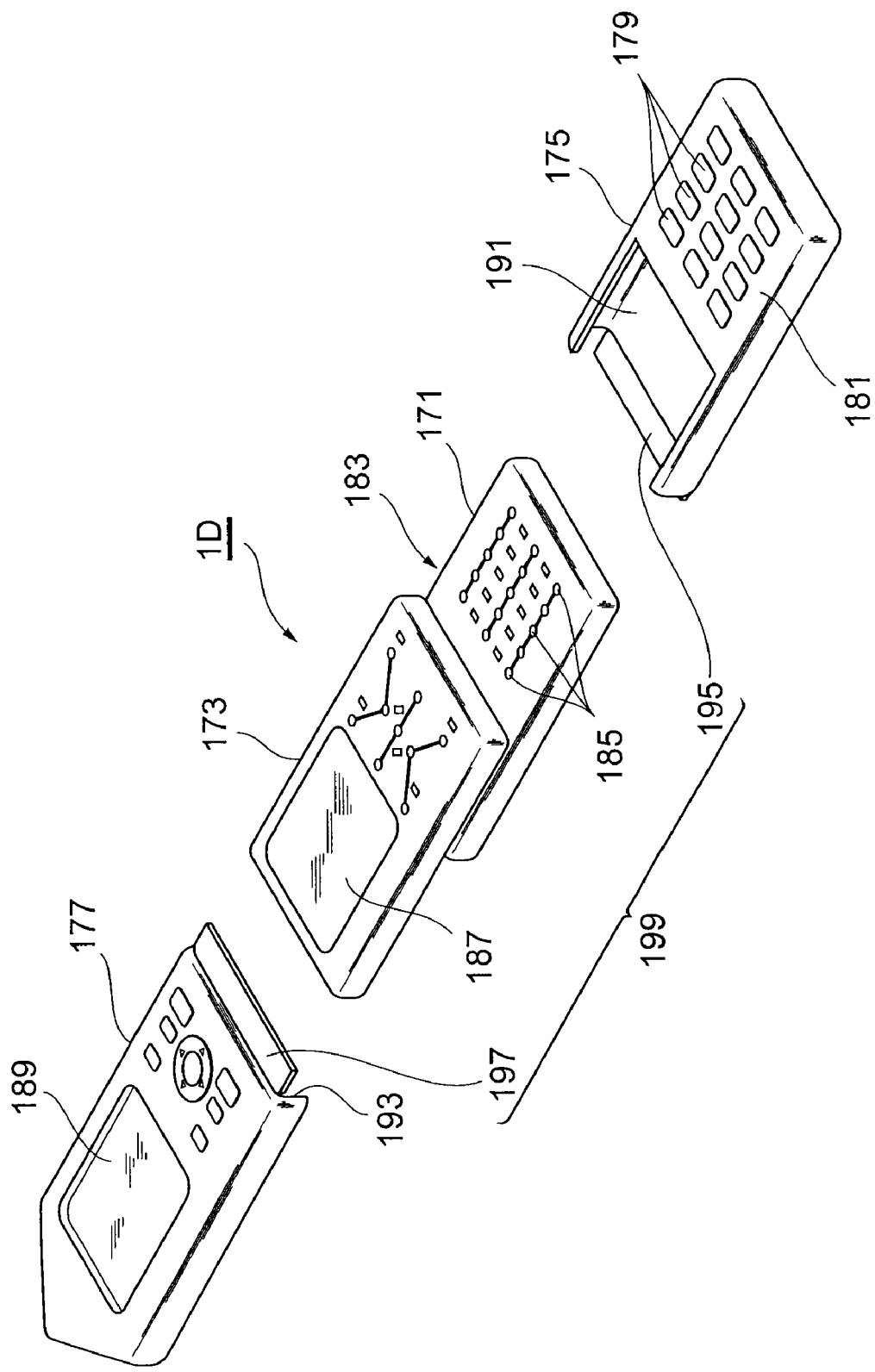
FIG. 18 is an exploded perspective-view diagram of a mobile phone according to a fourth embodiment.

A mobile phone 1D according to a fourth embodiment of the present invention is explained next with reference to FIGS. 18 to 19. FIG. 18 is a perspective-view diagram of a mobile phone 1D according to the present embodiment; and FIG. 19 is a diagram illustrating the opening and closing operation in the mobile phone 1D, (a) being a perspective-view diagram illustrating an open state and (b) being a perspective-view diagram illustrating a closed state.

The mobile phone 1D comprises a lower substrate (first substrate) 171 and an upper substrate (second substrate) 173 connected together so as to be slidable relative to each other. A lower casing (first casing) 175 is removably fitted to the lower substrate 171, and an upper casing (second casing) 177 is removably fitted to the upper substrate 173. The lower casing 175 and the upper casing 177 are separated and independent from each other prior to being fitted to the lower substrate 171 or the upper substrate 173.

An operation panel 181, having disposed thereon a plurality of operation buttons 179, is provided on the lower casing 175. An input device 183, for receiving inputs from the user through pressing of the operation buttons 179, is provided on the lower substrate 171. The input device 183 has a plurality of sensors 185 for detecting the pressure exerted by the user on the operations buttons 179, and a sensing circuit for receiving and optimizing the data detected by the sensors 185. A microphone and a wireless circuit (not shown) are mounted on the lower substrate 171.

On the upper substrate 173 there are mounted, for instance, a CPU for governing the driving control of the entire mobile phone 1D, a memory such as a RAM and/or ROM, a speaker and an antenna. A liquid crystal display (liquid crystal panel) 187 is further mounted on the upper substrate 173. A transparent window 189, for allowing the liquid crystal display 187 to be seen, is provided on the upper casing 177.

A fitting opening 191 for receiving the lower substrate 171 is formed in the lower casing 175.

A fitting opening 193 for receiving the upper substrate 173 is formed in the upper casing 177. A lower lid 195 is provided on the end of the lower casing 175, on the side where the fitting opening 191 is formed, while an upper lid 197 is provided on end of the upper casing 177, on the side where the fitting opening 193 is formed. With the lower substrate 171 completely inserted into the lower casing 175, the lower lid 195 abuts the end of the lower substrate 171, thereby fixing the latter. With the upper substrate 173 completely inserted into the upper casing 177, the upper lid 197 abuts the end of the upper substrate 173, thereby fixing the latter. The lower lid 195 and the upper lid 197 make up a slip-off prevention section 199.

In the mobile phone 1D according to the present embodiment, the lower casing 175 and the upper casing 177 are removably fitted to the lower substrate 171 or the upper substrate 173. Therefore, the overall design of the mobile phone 1D can be easily modified by replacing the lower casing 175 and the upper casing 177 by other casings. Moreover, the lower casing 175 and the upper casing 177 are separated from each other, and hence the lower casing 175 and the upper casing 177 can be fitted independently onto the lower substrate 171 or the upper substrate 173, even when the lower substrate 171 and the upper substrate 173 are connected so as to be slidable relative to each other. The lower casing 175 and the upper casing 177 are easy to replace. As a result, the needs of the user are easily met to a high degree.

The present invention is not limited only to the above embodiments. For instance, the lower substrate and the upper substrate may be connected so as to be swivelable relative to each other.

What is claimed is:

1. A mobile phone in which a first substrate and a second substrate are connected relatively movably to each other, comprising:
   a first casing removably fitted to said first substrate;
   a second casing separated from said first casing and removably fitted to said second substrate; and
   a slip-off prevention section for fixing said first casing to said first substrate, and fixing said second casing to said second substrate, wherein
   said slip-off prevention section further comprises,
   a first locking pawl provided retractably in said first substrate,
   a first spring section supporting said first locking pawl, a second locking pawl provided retractably in said second substrate, and a second spring section supporting said second locking pawl;

and a first locking hole, in which said first locking pawl engages, is formed in said first casing, and a second locking hole, in which said second locking pawl engages, is formed in said second casing, such that when compressed by said first casing, said first locking pawl retracts while elastically deforming said first spring section, said first casing being supported by said first locking pawl advancing into said first locking hole through decompression of said first spring section, and when compressed by said second casing, said second locking pawl retracts while elastically deforming said second spring section, said second casing being supported by said second locking pawl advancing into said second locking hole through decompression of said second spring section.

2. The mobile phone according to claim 1, wherein a connector section is provided in at least one of said first casing and said second casing, and an interface section, connected to said connector section, is provided in said first substrate or said second substrate.

3. The mobile phone according to claim 1, wherein an operation panel, having operation buttons arranged thereon, is provided in at least one of said first casing and said second casing, and an input device for receiving inputs from a user pressing said operation buttons, is provided in said first substrate or said second substrate.

4. The mobile phone according to claim 1, wherein a battery pack is provided in at least one among said first substrate and said second substrate, and said first casing or said second casing covers said battery pack, and serves as a lid thereof.

5. A mobile phone in which a first substrate and a second substrate are connected relatively movably to each other, comprising:

a first casing removably fitted to said first substrate;

a second casing separated from said first casing and removably fitted to said second substrate; and a slip-off prevention section for fixing said first casing to said first substrate, and fixing said second casing to said second substrate, wherein a first fitting opening for receiving said first substrate is formed at an end of said first casing, and a second fitting opening for receiving said second substrate is formed at an end of said second casing; and wherein said slip-off prevention section comprises:

a first lid, provided at said end of said first casing, for opening said first fitting opening through elastic deformation upon being pressed by said first substrate when said first substrate passes by, and for closing said first fitting opening by being restored to the original state after said first substrate has passed by; and a second lid, provided at said end of said second casing, for opening said second fitting opening through elastic deformation upon being pressed by said second substrate when said second substrate passes by, and for closing said second fitting opening by being restored to the original state after said second substrate has passed by.

6. A mobile phone in which a first substrate and a second substrate are connected relatively movably to each other, comprising:

a first casing removably fitted to said first substrate;

a second casing separated from said first casing and removably fitted to said second substrate; and a slip-off prevention section for fixing said first casing to said first substrate, and fixing said second casing to said second substrate, wherein said first substrate and said second substrate are foldably connected via a hinge;

a receiving opening for receiving said first substrate or said second substrate is formed at an end of said first casing and said second casing on a side adjacent to said hinge;

a pair of protruding pieces, protruding so as to flank said hinge, are provided on at least one of said ends of said first casing and said second casing, with respective engaging holes being formed in said pair of protruding pieces; and wherein said slip-off prevention section has an engaging pawl section that is retractably provided in said hinge, and a spring section for supporting said engaging pawl section, such that said engaging pawl section retracts while elastically deforming said spring section upon being pressed by said protruding piece as said protruding piece passes by, and said spring section decompresses, while causing said slip-off prevention section to advance into said engaging hole, to support thereby said protruding piece.

* * * * *